United States Patent
Yu et al.

(10) Patent No.: US 11,637,496 B2
(45) Date of Patent: Apr. 25, 2023

(54) ADAPTIVE ON-TIME CONTROL FOR FOUR-SWITCH SWITCHING CONVERTER

(71) Applicant: Chengdu Monolithic Power Systems Co., Ltd., Chengdu (CN)

(72) Inventors: Zhiyuan Yu, Hangzhou (CN); Xiaokang Wu, Hangzhou (CN); Min Xu, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 109 days.

(21) Appl. No.: 17/392,986

(22) Filed: Aug. 3, 2021

(65) Prior Publication Data

US 2022/0060113 A1 Feb. 24, 2022

(30) Foreign Application Priority Data

Aug. 20, 2020 (CN) .......................... 202010843629.8

(51) Int. Cl.
*H02M 3/158* (2006.01)
*H02M 1/088* (2006.01)
*H02M 1/00* (2006.01)

(52) U.S. Cl.
CPC ....... *H02M 3/1582* (2013.01); *H02M 1/0009* (2021.05); *H02M 1/0022* (2021.05); *H02M 1/088* (2013.01)

(58) Field of Classification Search
CPC ...... H02M 1/08; H02M 1/088; H02M 1/0022; H02M 1/0009; H02M 1/0003; H02M 3/156; H02M 3/157; H02M 3/158; H02M 3/1584
See application file for complete search history.

(56) References Cited

U.S. PATENT DOCUMENTS

| | | | |
|---|---|---|---|
| 9,059,633 B2 | 6/2013 | Yang | |
| 9,035,640 B2 | 4/2015 | Chenggang | |
| 9,602,004 B2 | 3/2017 | Chenggang | |
| 9,876,431 B2 | 1/2018 | Yike | |
| 9,882,489 B2 | 1/2018 | Lei | |
| 9,966,851 B2 | 5/2018 | Qian | |
| 10,075,075 B2 | 9/2018 | Jian | |
| 10,250,141 B2 | 4/2019 | Jian | |
| 10,790,737 B2 | 9/2020 | Suhua | |

(Continued)

OTHER PUBLICATIONS

U.S. Appl. No. 16/988,380, filed Aug. 7, 2020, Changjiang.

*Primary Examiner* — Thienvu V Tran
*Assistant Examiner* — Shahzeb K Ahmad
(74) *Attorney, Agent, or Firm* — Perkins Coie LLP

(57) ABSTRACT

A switching converter has four switches and a control circuit. The control circuit provides a first drive signal to control a first switch and a second drive signal to control a second switch based on a first set signal, and provides a third drive signal to control the third switch and a fourth drive signal to control the fourth switch based on a second set signal. When an output voltage is larger than an input voltage, an on-time period of the third switch is adaptively adjusted according to the input voltage, the output voltage and a first parameter. When the output voltage is less than the input voltage, the on-time period of the third switch is adaptively adjusted according to the input voltage, the output voltage and a second parameter.

17 Claims, 6 Drawing Sheets

(56) References Cited

U.S. PATENT DOCUMENTS

| | | | |
|---|---|---|---|
| 2011/0279098 A1* | 11/2011 | Ren | H02M 3/1582 323/234 |
| 2014/0049104 A1* | 2/2014 | Hagihara | H02J 9/062 307/23 |
| 2014/0103898 A1* | 4/2014 | Shrivastava | H02M 3/1563 323/311 |
| 2014/0354250 A1* | 12/2014 | Deng | H02M 3/157 323/271 |
| 2015/0123631 A1* | 5/2015 | Hang | H02M 3/158 323/271 |
| 2016/0315535 A1* | 10/2016 | Ouyang | H02M 3/1582 |
| 2017/0187290 A1* | 6/2017 | Li | H02M 3/1582 |
| 2019/0296642 A1* | 9/2019 | Wu | H02M 3/1563 |
| 2019/0326816 A1* | 10/2019 | Sonntag | H02M 3/1582 |
| 2020/0028441 A1 | 1/2020 | Miao | |
| 2021/0184577 A1* | 6/2021 | Yang | H02M 3/1582 |

\* cited by examiner

ADAPTIVE ON-TIME CONTROL FOR FOUR-SWITCH SWITCHING CONVERTER

CROSS-REFERENCE TO RELATED APPLICATIONS

This application claims the benefit of CN application 202010843629.8, filed on Aug. 20, 2020, and incorporated herein by reference.

TECHNICAL FIELD

The present invention generally relates to electronic circuits, and more particularly but not exclusively, to switching converter.

BACKGROUND

With the rapid development of consumer electronics market, portable electronic products continue to be miniaturized and lightweight. The smaller size of the products makes the volume and capacity of the batteries decrease. This requires that the conversion efficiency of the power supply module be improved as much as possible to reduce the power consumption and to provide a stable output voltage over a wide range of battery voltage, to prolong the battery life. Switching converters capable of operating over a wide input range are widely used in such applications.

FIG. 1 is a circuit schematic diagram of a traditional four-switch switching converter. The switching converter converts an input voltage VIN to an output voltage Vo, and the switching converter comprises switches S1~S4, an inductor L and an output capacitor Co. When the switches S1 and S3 are on and the switches S2 and S4 are off, the inductor L stores energy. When the switches S1 and S3 are off and the switches S2 and S4 are on, the energy stored by the inductor L transfers to the load. Due to the continuous operation of the four switches S1~S4, the power loss of the traditional switching converter is large.

In order to reduce power consumption, different operating modes can be introduced, such as boost mode, buck mode, and buck-boost mode. The buck-boost mode serves as a transition between the boost mode and the buck mode, and the switches S1~S4 are turned on and off respectively by a controller. However, design for the buck-boost mode is complicated, which needs considering both efficiency and safety.

SUMMARY

Embodiments of the present invention are directed a control circuit for a switching converter. The switching converter is configured to receive an input voltage and provide an output voltage, and the switching converter comprises a first switch, a second switch, a third switch and a fourth switch. The control circuit comprises a set signal generator and a switch control circuit. The set signal generator is configured to receive a reference signal and a feedback signal representative of the output voltage, provide a first set signal and a second set signal based on the feedback signal and the reference signal. The switch control circuit is configured to provide a first drive signal to control the first switch and a second drive signal to control the second switch based on the first set signal, and provide a third drive signal to control the third switch and a fourth drive signal to control the fourth switch based on the second set signal. When the output voltage is larger than the input voltage, an on-time period of the third switch is adaptively adjusted according to the input voltage, the output voltage and a first parameter. When the output voltage is less than the input voltage, the on-time period of the third switch is adaptively adjusted according to the input voltage, the output voltage and a second parameter, the second parameter is different from the first parameter.

Embodiments of the present invention are also directed to a control method for a switching converter. The switching converter is configured to receive an input voltage and provide an output voltage, and the switching converter comprises a first switch, a second switch, a third switch and a fourth switch. The control method comprises providing a first set signal to turn on the first switch based on a reference signal and the output voltage. Providing a second set signal to turn on the third switch based on the first set signal. Generating a first on-time period based on the input voltage and the output voltage, and generating a second on-time period based on the input voltage, the output voltage, a first parameter, and a second parameter. Turning on the first switch and turning off the second switch when an on-time period of the first switch achieves the first on-time period, and turning on the third switch and turning off the fourth switch when an on-time period of the third switch achieves the second on-time period.

Embodiments of the present invention are further directed to a switching converter, comprising a first switch, a second switch, an inductor, a third switch, a fourth switch and a control circuit. The first switch has a first terminal, a second terminal, and a control terminal, wherein the first terminal of the first switch is configured to receive an input voltage. The second switch has a first terminal, a second terminal, and a control terminal, wherein the first terminal of the second switch is coupled to the second terminal of the first switch, the second terminal of the second switch is coupled to a reference ground. The inductor has a first terminal and a second terminal, wherein the first terminal of the inductor is coupled to the second terminal of the first switch and the first terminal of the second switch. The third switch has a first terminal, a second terminal and a control terminal, wherein the first terminal of the third switch is coupled to the second terminal of the inductor, and the second terminal of the third switch is coupled to the reference ground. The fourth switch has a first terminal, a second terminal and a control terminal, wherein the first terminal of the fourth switch is coupled to the second terminal of the inductor and the first terminal of the third switch, and the second terminal of the fourth switch is configured to provide an output voltage. The control circuit is configured to provide a first drive signal to control the first switch and a second drive signal to control the second switch based on a first set signal, and provide a third drive signal to control the third switch and a fourth drive signal to control the fourth switch based on a second set signal. When the output voltage is larger than the input voltage, an on-time period of the third switch is adaptively adjusted according to the input voltage, the output voltage and a first parameter. When the output voltage is less than the input voltage, the on-time period of the third switch is adaptively adjusted according to the input voltage, the output voltage and a second parameter, the second parameter is different from the first parameter.

These and other features of the present invention will be readily apparent to persons of ordinary skill in the art upon reading the entirety of this disclosure, which includes the accompanying drawings and claims.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration, and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element. When a signal is described as "equal to" another signal, it is substantially identical to the other signal.

Figure 1:
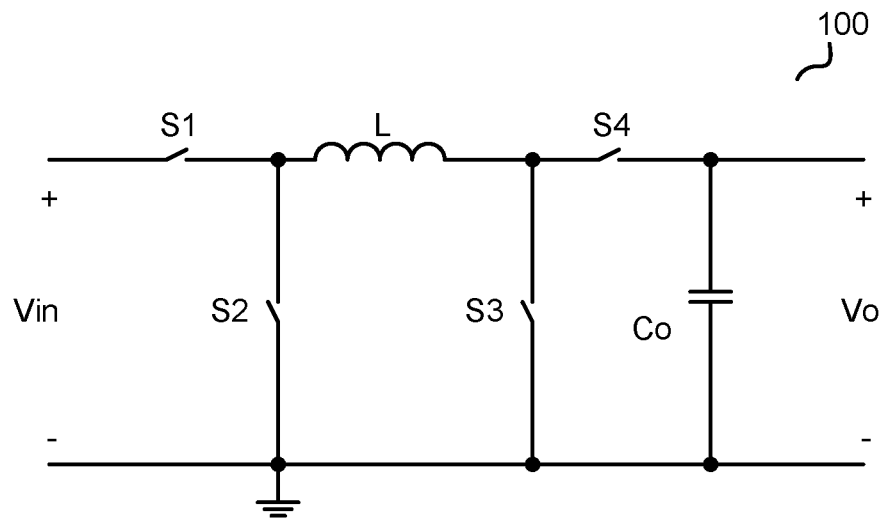
FIG. 1 is a circuit schematic diagram of a traditional four-switch switching converter.
Figure 2:
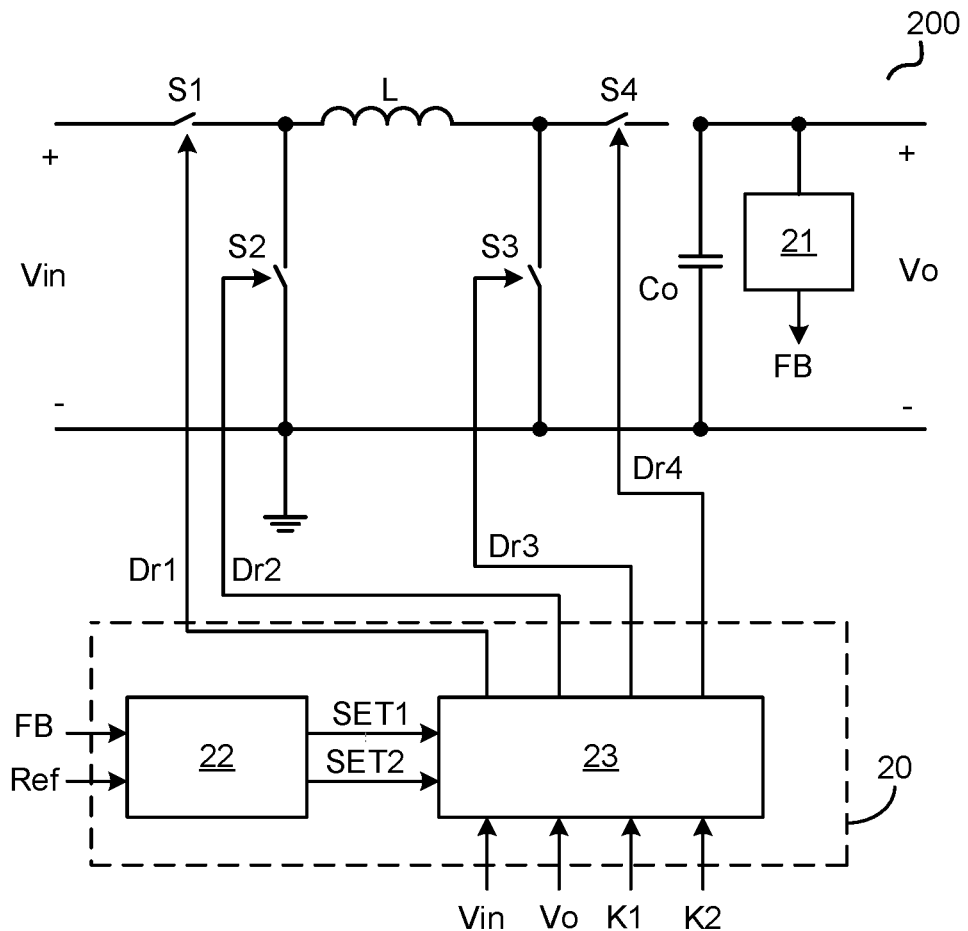
FIG. 2 is a schematic block diagram of a switching converter 200 in accordance with an embodiment of the present invention.

FIG. 2 is a schematic block diagram of a switching converter 200 in accordance with an embodiment of the present invention. The switching converter 200 comprises switches S1~S4, an inductor L, an output capacitor Co, a feedback circuit 21, and a controller 20. The controller 20 comprises a set signal generator 22 and a switch control circuit 23. The switch S1 has a first end, a second end and a control end, wherein the first end of the switch S1 receives an input voltage Vin. The switch S2 has a first end, a second end and a control end, wherein the first end of the switch S2 is coupled to the second end of the switch S1, and the second end of the switch S2 is connected to a reference ground. The inductor L has a first end and a second end, wherein the first end of the inductor L1 is coupled to the second end of the switch S1 and the first end of the switch S2. The switch S3 has a first end, a second end and a control end, wherein the first end of the switch S3 is coupled to the second end of the inductor L, and the second end of the switch S3 is connected to the reference ground. The switch S4 has a first end, a second end and a control end, wherein the first end of the switch S4 is coupled to the second end of the inductor L and the first end of the switch S3, and the second end of the switch S4 provides the output voltage Vo. The output capacitor Co is coupled between the second end of the switch S4 and the reference ground. The switches S1~S4 can be any type of controllable semiconductor switching devices, such as metal oxide semiconductor field-effect switches (MOSFET), insulated gate bipolar switches (IGBT), etc.

The feedback circuit 21 generates a feedback signal FB representing the output voltage Vo. The feedback circuit 21 May comprise, for example, a resistor divider, a differential sampling circuit, etc. The set signal generator 22 receives the feedback signal FB and a reference signal Ref. The set signal generator 22 generates a first set signal Set1 according to the feedback signal FB and the reference signal Ref to turn on the switch S1. The set signal generator 22 further generates the set signal Set2 according to the set signal Set1 to turn on the switch S3. When the switching converter 200 works in the buck-boost mode, the controller 20 controls an on-time period of the switch S1 according to the input voltage Vin and the output voltage Vo, and controls an on-time period of the switch S3 according to the input voltage Vin, the output voltage Vo, a parameter K1 and a parameter K2. When the output voltage Vo is larger than the input voltage Vin, the controller 20 controls the on-time period of the switch S3 according to the input voltage Vin, the output voltage Vo and the parameter K1. And when the output voltage Vo is less than the input voltage Vin, the controller 20 controls the on-time period of the switch S3 according to the input voltage Vin, the output voltage Vo and the parameter K2.

In one embodiment, the switch control circuit 23 is coupled to the set signal generator 22 to receive the set signal SET1 and the set signal SET2. And based on the set signal SET1, the set signal SET2, the input voltage Vin, the output voltage Vo, the parameter K1, and the parameter K2, the switch control circuit 23 is configured to provide a driving signal Dr1 to control the switch S1, a driving signal Dr2 to control the switch S2, a driving signal Dr3 to control the switch S3, and a driving signal Dr4 to control the switch S4.

Figure 3:
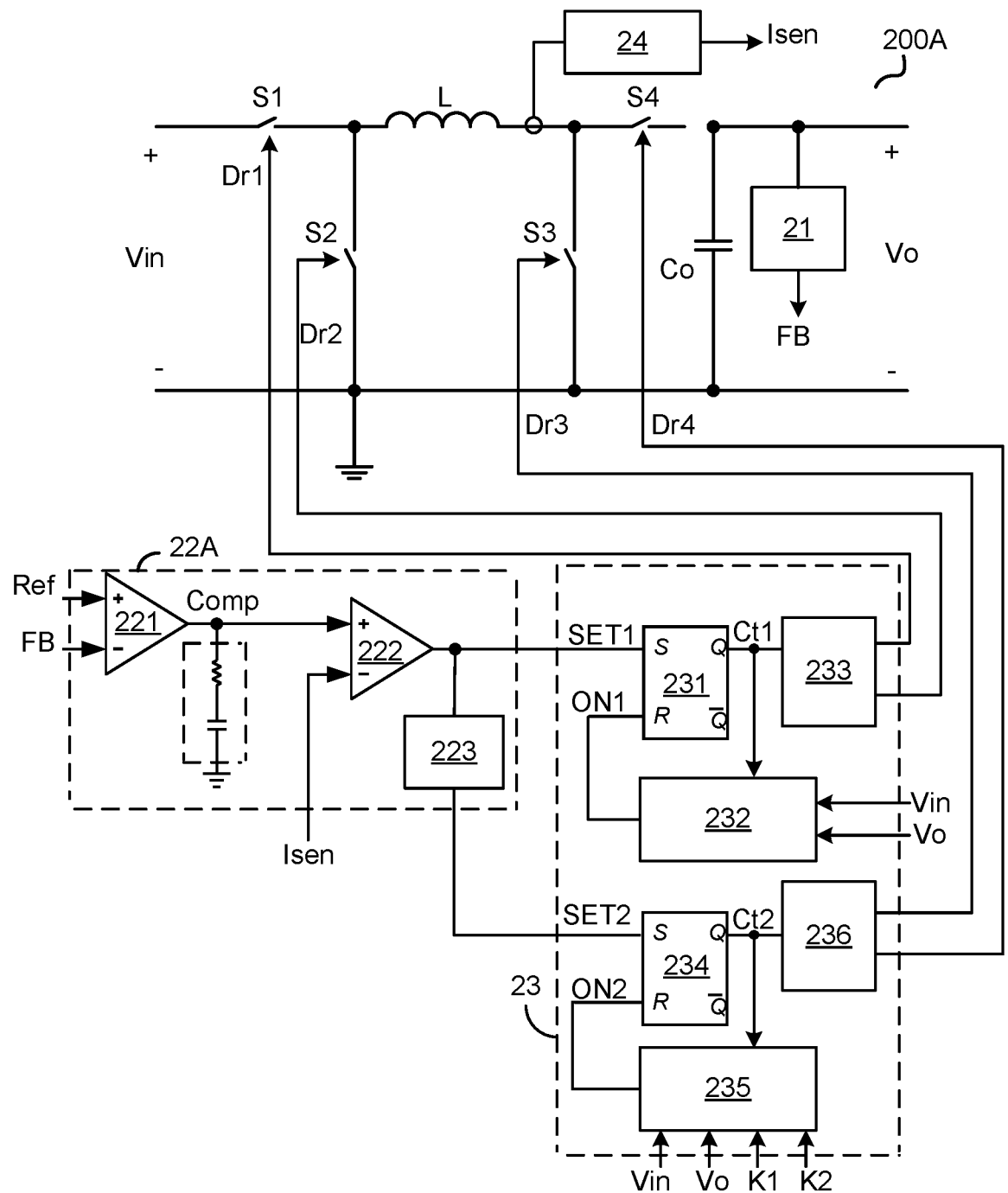
FIG. 3 is a schematic block diagram of a switching converter 200A in accordance with an embodiment of the present invention.

FIG. 3 is a schematic block diagram of a switching converter 200A in accordance with an embodiment of the present invention. The switching converter 200A comprises a set signal generator 22A. As shown in FIG. 3, the set signal generator 22A comprises an error amplifier 221 and a comparator 222. The error amplifier 221 comprises a first input terminal configured to receive the reference signal Ref, a second input terminal configured to receive the feedback signal FB, and an output terminal. The output terminal of the error amplifier 221 is configured to provide an error compensation signal Comp according to a difference between the reference signal Ref and the feedback signal FB (Ref-FB). In one example as shown in FIG. 3, a compensation network comprising a resistor and a capacitor is arranged between the output terminal of the error amplifier 221 and the reference ground. The comparator 222 comprises a non-inverting terminal, an inverting terminal, and an output terminal. The non-inverting terminal of the comparator 222 is coupled to the output terminal of the error amplifier 221 to receive the error compensation signal Comp. The inverting terminal of the comparator 222 receives a current sense signal Isen indicating a current flowing through the inductor L. The output terminal of the comparator 222 provides the set signal SET1 via comparing the error compensation signal Comp with the current sense signal Isen. In the example shown in FIG. 3, the set signal generator 22A further comprises a delay circuit 223. The delay circuit 223 delays the set signal SET1 by a preset time period tdl to generate the set signal SET2. In the example shown in FIG. 3, the switching converter 200A further comprises a current sense circuit 24. The current sense circuit 24 provides the current sense signal Isen according to the current flowing through the inductor L. The current sense can be done by means of a sampling resistor, a current transformer or a current mirror. Further, the current sense circuit 24 can also estimate the current flowing through the inductor L by sampling each current flowing through a corresponding one of the switches S1~S4.

In one embodiment, the switch control circuit 23 comprises a RS flip-flop 231, an on-time control circuit 232, a driver 233, a RS flip-flop 234, an on-time control circuit 235, and a driver 236. The RS flip-flop 231 has s set terminal S, a reset terminal R, and an output terminal Q. The set terminal S of the RS flip-flop 231 receives the set signal SET1, the reset terminal R of the RS flip-flop 231 receives an on-time control signal ON1, and the output terminal Q of the RS flip-flop 231 provides a control signal Ct1 based on the set signal SET1 and the on-time control signal ON1. In one embodiment, when the current sense signal Isen is less than the error compensation signal Comp, the set signal SET1 is active to turn on the switch S1 and turn off the switch S2 via the control signal Ct1. In one embodiment, the on-time control circuit 232 provides the on-time control signal ON1 to control the on-time period of the switch S1 within one switching period equals a time period Ton1. In one embodiment, the on-time control circuit 232 obtains the time period Ton1 based on the input voltage Vin and the output voltage Vo. For example, it can be obtained by the following formula (1).

$$Ton1 = Tperiod * \frac{Vo}{Vin} \quad (1)$$

Where the Tperiod represents the switching period.

The RS flip-flop 234 has s set terminal S, a reset terminal R, and an output terminal Q. The set terminal S of the RS flip-flop 234 receives the set signal SET2, the reset terminal R of the RS flip-flop 234 receives an on-time control signal ON2, and the output terminal Q of the RS flip-flop 234 provides a control signal Ct2 based on the set signal SET2 and the on-time control signal ON2. In one embodiment, when the current sense signal Isen is less than the error compensation signal Comp, after the preset time period tdl, the set signal SET2 is active to turn on the switch S3 and turn off the switch S4 via the control signal Ct2. In one embodiment, the on-time control circuit 235 provides the on-time control signal ON2 to control the on-time period of the switch S3 within one switching period equals a time period Ton2. In one embodiment, the on-time control circuit 235 obtains the time period Ton2 based on the input voltage Vin, the output voltage Vo, the parameter K1, and the parameter K2. For example, it can be obtained by the following formula (2).

$$\begin{cases} Ton2 = Tbase + K1 \cdot (\frac{Vo}{Vin} - 1) & \text{if } Vo \geq Vin \\ Ton2 = Tbase - K2 \cdot (1 - \frac{Vo}{Vin}) & \text{if } Vo < Vin \end{cases} \quad (2)$$

Where Tbase is a preset basic time period, e.g., 400 ns.

In one embodiment, when the output voltage Vo is larger than or equal to the input voltage Vin, the time period Ton2 equals the preset basic time period Tbase adding a first time threshold. The first time threshold is generated based on the input voltage Vin, the output voltage Vo, and the parameter K1, e.g., the first time threshold equals K1(Vo−Vin)/Vin. In one embodiment, when the output voltage Vo is less than the input voltage Vin, the time period Ton2 equals the preset basic time period Tbase subtracting a second time threshold. The second time threshold is generated based on the input voltage Vin, the output voltage Vo, and the parameter K2, e.g., the second time threshold equals K2(Vin−Vo)/Vin. In one example, the parameter K1 and the parameter K2 are different with each other. The on-time period of the switch S3 is dynamically adjusted based on the output voltage Vo, the input voltage Vin, the parameter K1, and the parameter K2, thus the circuit design is easier. It can not only meet the safety requirements, smooth transition to the boost mode or buck mode, but also can have a smaller ripple, and higher efficiency.

In one embodiment, the driver 233 provides the drive signals Dr1 and Dr2 based on the control signal Ct1 to control the switches S1 and S2 respectively. Drive signals Dr1 and Dr2 are complementary with each other. In order to avoid shoot-through between the switches S1 and S2, the driver 233 further introduces a dead time between the drive signals Dr1 and Dr2.

In one embodiment, the driver 236 provides the drive signals Dr3 and Dr4 based on the control signal Ct2 to control the switches S3 and S4 respectively. Drive signals Dr3 and Dr4 are complementary with each other. In order to avoid shoot-through between the switches S3 and S4, the driver 236 further introduces the dead time between the drive signals Dr3 and Dr4.

One with an ordinary skill in the art should know that the specific circuit structure of the switch control circuit 23 is not limited by FIG. 3.

Figure 4:
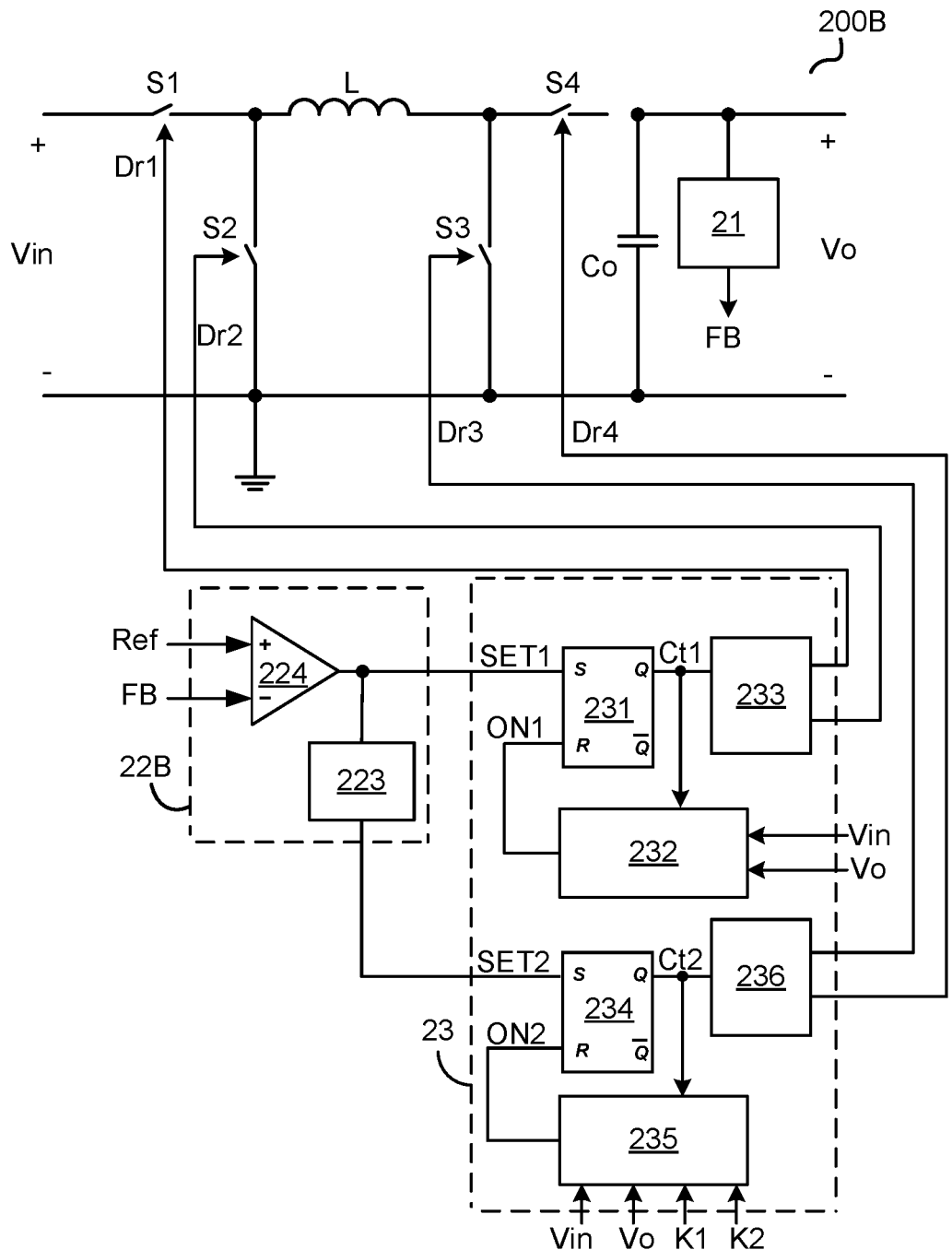
FIG. 4 is a schematic block diagram of a switching converter 200B in accordance with an embodiment of the present invention.

FIG. 4 is a schematic block diagram of a switching converter 200B in accordance with an embodiment of the present invention. In the switching converter 200B, the set signal generator 22B comprises a comparator 224. The comparator 224 comprises a non-inverting terminal, an inverting terminal and an output terminal. The non-inverting terminal of the comparator 224 receives the reference signal Ref, the inverting terminal of the comparator 224 receives the feedback signal FB, and the output terminal of the comparator 224 provides the set signal SET1 via comparing the feedback signal FB with the reference signal Ref. Similar to the switching converter 200A shown in FIG. 3, the set signal generator 22B further comprises the delay circuit 223, which generates the set signal SET2 by delaying the set signal SET1 the preset time period tdl.

Figure 5:
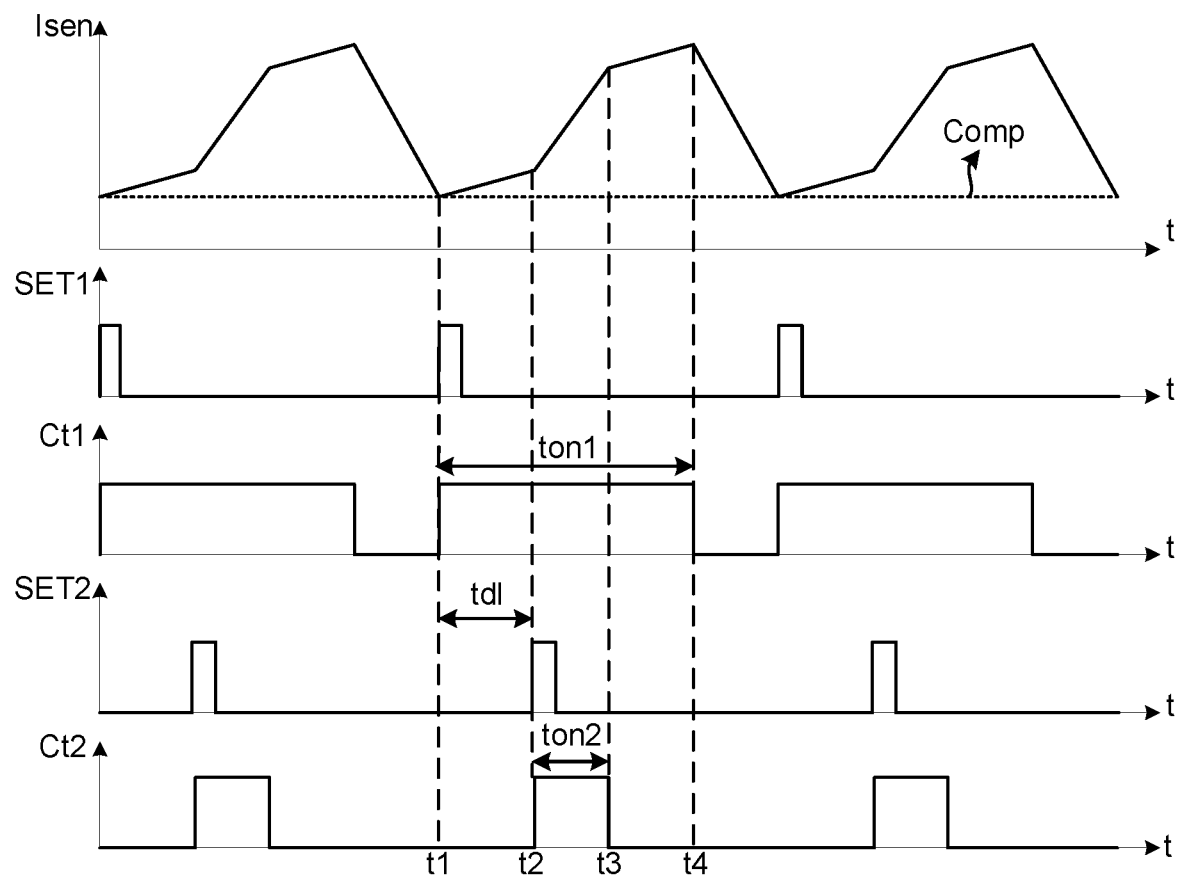
FIG. 5 shows waveforms of the switching converter 200A shown in FIG. 3 in accordance with an embodiment of the present invention.

FIG. 5 shows waveforms of the switching converter 200A shown in FIG. 3 in accordance with an embodiment of the present invention. From top to bottom are the current sense signal Isen, the set signal SET1, the control signal Ct1, the set signal SET2, and the control signal Ct2. At time t1, the current sense signal decreases to less than the error compensation signal Comp, the set signal SET1 becomes at a high voltage level, the control signal Ct1 is set to be active, e.g., becomes at the high voltage level, the switch S1 is turned ON, and the switch S2 is turned OFF. After the preset time period tdl, at time t2, the set signal SET2 becomes at the high voltage level, the control signal Ct2 is set to be active, e.g., becomes at the high voltage level, the switch S3 is turned ON, and the switch S4 is turned OFF. At time t3, the on-time period of the switch S3 achieves the time period Ton2, the control signal Ct2 is reset, e.g., becomes at a low voltage level, the switch S3 is turned OFF, and the switch S4 is turned ON. At time t4, the on-time period of the switch S1 achieves the time period Ton1, the control signal Ct1 is reset, e.g., becomes at the low voltage level, the switch S1 is turned OFF and the switch S2 is turned ON.

Figure 6:
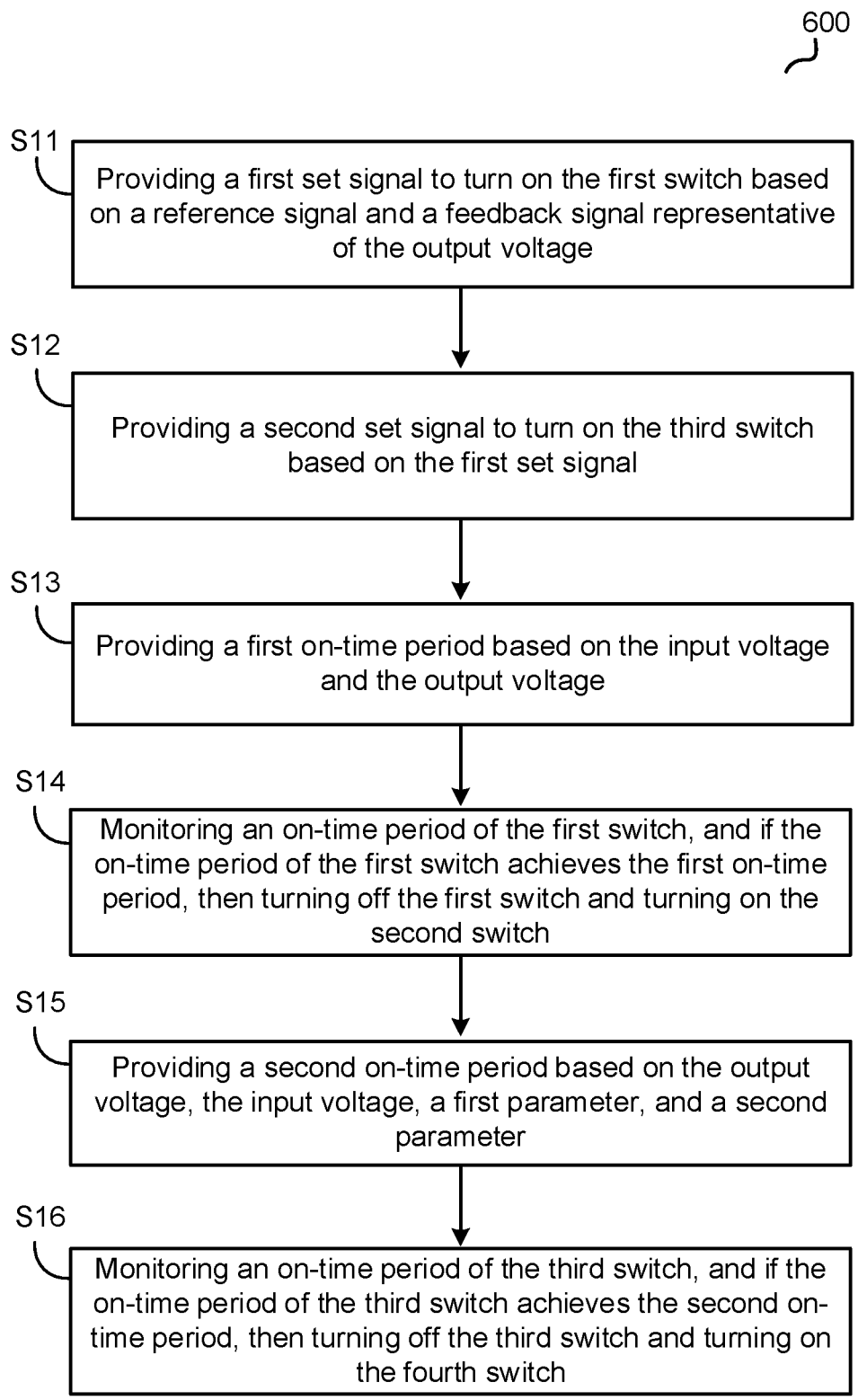
FIG. 6 is a flowchart of a control method 600 for a switching converter in accordance with an embodiment of the present invention.

FIG. 6 is a flowchart of a control method 600 for a switching converter in accordance with an embodiment of the present invention. The switching converter converts the input voltage to the output voltage. The switching converter comprises a first switch, a second switch, a third switch, a fourth switch, and an inductor. The control method 600 comprises steps S11-S16.

At the step S11, providing a first set signal to turn on the first switch based on a reference signal and a feedback signal representative of the output voltage.

At the step S12, providing a second set signal to turn on the third switch based on the first set signal.

At the step S13, providing a first on-time period based on the input voltage and the output voltage.

At the step S14, monitoring an on-time period of the first switch, and if the on-time period of the first switch achieves the first on-time period, then turning off the first switch and turning on the second switch.

At the step S15, providing a second on-time period based on the output voltage, the input voltage, a first parameter, and a second parameter.

At the step S16, monitoring an on-time period of the third switch, and if the on-time period of the third switch achieves the second on-time period, then turning off the third switch and turning on the fourth switch.

Figure 7:
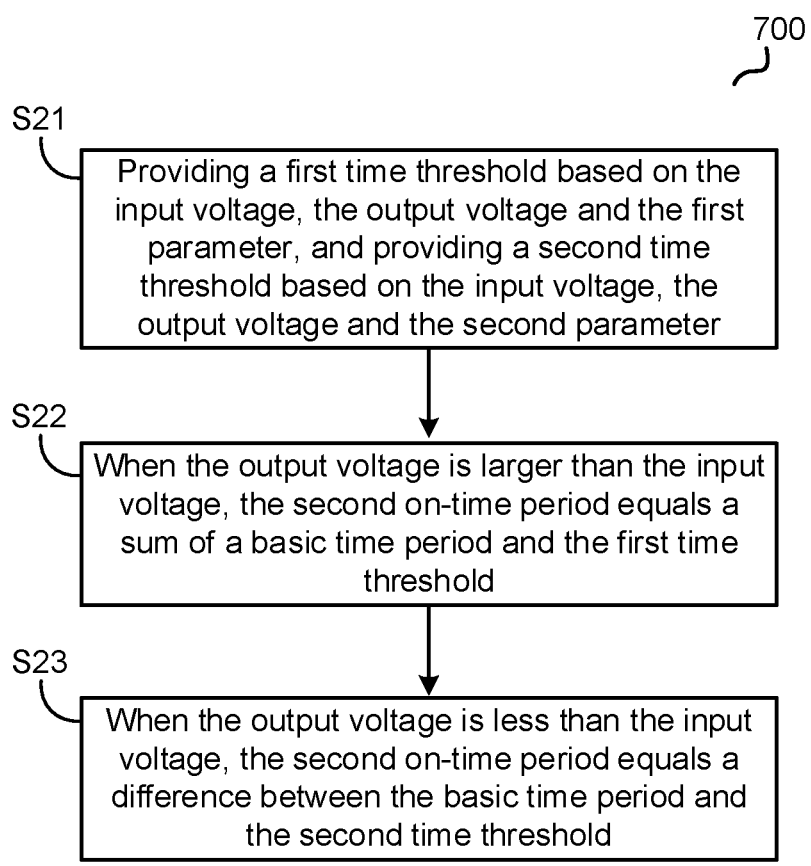
FIG. 7 is a flowchart of a method 700 for generating the second on-time period in accordance with an embodiment of the present invention.

FIG. 7 is a flowchart of a method 700 for generating the second on-time period in accordance with an embodiment of the present invention. The method 700 comprises steps S21-23.

At the step S21, providing a first time threshold based on the input voltage, and the output voltage and the first parameter, and providing a second time threshold based on the input voltage, the output voltage and the second parameter.

At the step S22, when the output voltage is larger than the input voltage, the second on-time period equals a sum of a basic time period and the first time threshold.

At the step S23, when the output voltage is less than the input voltage, the second on-time period equals a difference between the basic time period and the second time threshold.

Note that in the flowchart described above, the functions indicated in the boxes can also occur in a different order than those shown in the FIG. 6 and FIG. 7. Fox example, two boxes presented one after another can actually be executed essentially at the same time, or sometimes in reverse order, depending on the specific functionality involved.

Obviously many modifications and variations of the present invention are possible in light of the above teachings. It is therefore to be understood that within the scope of the appended claims the invention may be practiced otherwise than as specifically described. It should be understood, of course, that the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A control circuit for a switching converter, wherein the switching converter is configured to receive an input voltage and provide an output voltage, and the switching converter having a first switch, a second switch, a third switch and a fourth switch, the control circuit comprising:
    a set signal generator, configured to receive a reference signal and a feedback signal representative of the output voltage, the set signal generator is configured to provide a first set signal and a second set signal based on the feedback signal and the reference signal; and
    a switch control circuit, configured to provide a first drive signal to control the first switch and a second drive signal to control the second switch based on the first set signal, and configured to provide a third drive signal to control the third switch and a fourth drive signal to control the fourth switch based on the second set signal;
    wherein when the output voltage is larger than the input voltage, an on-time period of the third switch is adaptively adjusted according to the input voltage, the output voltage and a first parameter, such that the on-time period of the third switch increases as a difference between the output voltage and the input voltage increases; and wherein
    when the output voltage is less than the input voltage, the on-time period of the third switch is adaptively adjusted according to the input voltage, the output voltage and a second parameter, the second parameter is different from the first parameter, such that the on-time period of the third switch decreases as the difference between the input voltage and the output voltage increases.

2. The control circuit of claim 1, wherein the switch control circuit further comprises:
    a first on-time control circuit, configured to control an on-time period of the first switch based on the input voltage and the output voltage; and
    a second on-time control circuit, configured to control the on-time period of the third switch based on the input voltage, the output voltage, the first parameter and the second parameter.

3. The control circuit of claim 1, wherein the set signal generator is configured to provide the second set signal by delaying the first set signal a preset time period.

4. The control circuit of claim 1, wherein:
    when the output voltage is larger than the input voltage, the on-time period of the third switch equals a basic time period adding a first time threshold; and when the output voltage is less than the input voltage, the on-time period of the third switch equals the basic time period subtracting a second time threshold.

5. The control circuit of claim 4, wherein the first time threshold is generated according to the input voltage, the output voltage and the first parameter, and the second time threshold is generated according to the input voltage, the output voltage and the second parameter.

6. The control circuit of claim 1, wherein the switch control circuit further comprises:
a first on-time control circuit, configured to provide a first on-time control signal based on the input voltage and the output voltage to control an on-time period of the first switch;
a second on-time control circuit, configured to provide a second on-time control signal based on the input voltage, the output voltage, the first parameter and the second parameter to control the on-time period of the third switch;
a first driver, configured to provide the first drive signal to control the first switch, and the second drive signal to control a second switch based on the first set signal and the first on-time control signal; and
a second driver, configured to provide the third drive signal to control the third switch and the fourth drive signal to control the fourth switch based on the second set signal and the second on-time control signal.

7. The control circuit of claim 1, wherein the set signal generator further comprises:
a comparator, having a first input terminal, a second input terminal and an output terminal, wherein the first input terminal is configured to receive the reference signal, the second input terminal is configured to receive the feedback signal, and the output terminal is configured to provide the first set signal via comparing the feedback signal with the reference signal.

8. The control circuit of claim 1, wherein the set signal generator further comprises:
an error amplifier, having a first input terminal, a second input terminal and an output terminal, wherein the first input terminal of the error amplifier is configured to receive the reference signal, the second input terminal of the error amplifier is configured to receive the feedback signal, and the output terminal of the error amplifier is configured to provide an error compensation signal based on a difference between the reference signal and the feedback signal; and
a comparator, having a first input terminal, a second input terminal and an output terminal, wherein the first input terminal of the comparator is coupled to the output terminal of the error amplifier to receive the error compensation signal, the second input terminal of the comparator is configured to receive a current sense signal representative of a current flowing through the switching converter, and the output terminal of the comparator is configured to provide the first set signal via comparing the current sense signal with the error compensation signal.

9. A control method for a switching converter, wherein the switching converter is configured to receive an input voltage and provide an output voltage, and the switching converter having a first switch, a second switch, a third switch and a fourth switch, the control method comprising:
providing a first set signal to turn on the first switch based on a reference signal and the output voltage;
providing a second set signal to turn on the third switch based on the first set signal;
generating a first on-time period based on the input voltage and the output voltage;
generating a second on-time period based on the input voltage, the output voltage, a first parameter, and a second parameter;
turning on the first switch and turning off the second switch when an on-time period of the first switch achieves the first on-time period;
turning on the third switch and turning off the fourth switch when an on-time period of the third switch achieves the second on-time period;
increasing the on-time period of the third switch as a difference between the output voltage and the input voltage increases when the output voltage is larger than the input voltage; and
decreasing the on-time period of the third switch as the difference between the input voltage and the output voltage increases when the output voltage is less than the input voltage.

10. The control method of claim 9, further comprising:
providing the second set signal by delaying the first set signal a preset time period.

11. The control method of claim 9, wherein:
when the output voltage is larger than the input voltage, the second on-time period equals a basic time period adding a first time threshold; and
the first time threshold is generated based on the input voltage, the output voltage, and the first parameter.

12. The control method of claim 9, wherein:
when the output voltage is less than the input voltage, the second on-time period equals the basic time period subtracting a second time threshold; and
the second time threshold is generated based on the input voltage, the output voltage, and the second parameter.

13. A switching converter, comprising:
a first switch, having a first end, a second end, and a control end, wherein the first end of the first switch is configured to receive an input voltage;
a second switch, having a first end, a second end, and a control end, wherein the first end of the second switch is coupled to the second end of the first switch, the second end of the second switch is coupled to a reference ground;
an inductor, having a first end and a second end, wherein the first end of the inductor is coupled to the second end of the first switch and the first end of the second switch;
a third switch, having a first end, a second end and a control end, wherein the first end of the third switch is coupled to the second end of the inductor, and the second end of the third switch is coupled to the reference ground;
a fourth switch, having a first end, a second end and a control end, wherein the first end of the fourth switch is coupled to the second end of the inductor and the first end of the third switch, and the second end of the fourth switch is configured to provide an output voltage; and
a control circuit, configured to provide a first drive signal to control the first switch and a second drive signal to control the second switch based on a first set signal, and provide a third drive signal to control the third switch and a fourth drive signal to control the fourth switch based on a second set signal; wherein
when the output voltage is larger than the input voltage, an on-time period of the third switch is adaptively adjusted according to the input voltage, the output voltage and a first parameter, such that the on-time period of the third switch increases as a difference between the output voltage and the input voltage increases; and wherein when the output voltage is less than the input voltage, the on-time period of the third switch is adaptively adjusted according to the input voltage, the output voltage and a second parameter, such that the on-time period of the third switch decreases as the difference between the input voltage and the output voltage increases, the second parameter is different from the first parameter.

14. The switching converter of claim 13, wherein when the output voltage is larger than the input voltage, the on-time period of the third switch equals a basic time period adding a first time threshold, the first time threshold is generated according to the input voltage, the output voltage and the first parameter.

15. The switching converter of claim 13, wherein when the output voltage is less than the input voltage, the on-time period of the third switch equals a basic time period subtracting a second time threshold, the second time threshold is generated according to the input voltage, the output voltage and the second parameter.

16. The switching converter of claim 13, wherein the control circuit further comprises:
a set signal generator, configured to receive a reference signal and a feedback signal representative of the output voltage, the set signal generator is configured to provide the first set signal based on the feedback signal and the reference signal, and the set signal generator is configured to provide the second set signal by delaying the first set signal a preset time period.

17. The switching converter of claim 13, wherein the control circuit further comprises:
a first on-time control circuit, configured to control an on-time period of the first switch based on the input voltage and the output voltage; and
a second on-time control circuit, configured to control the on-time period of the third switch based on the input voltage, the output voltage, the first parameter and the second parameter.

* * * * *